Figure 21:
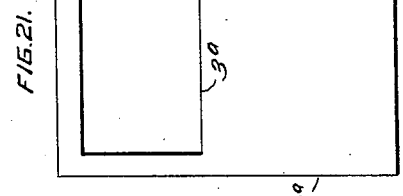
Figure 20:
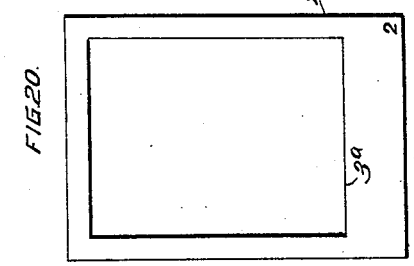
Figure 19:
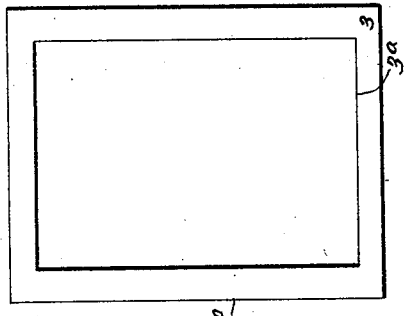
Figure 17:
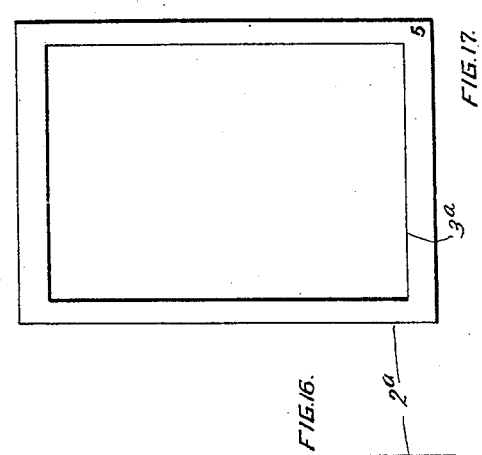
Figure 16:
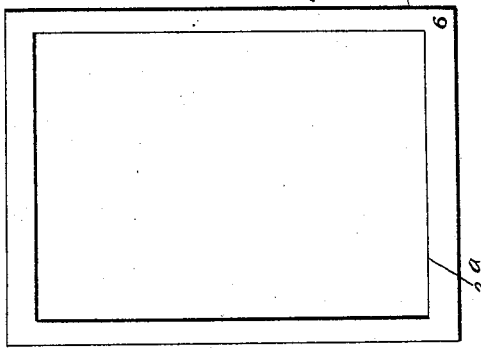
Figure 18:
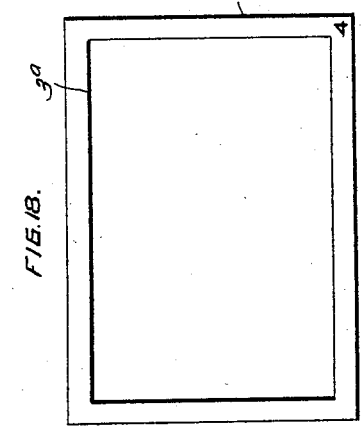

W. FAAS.
PHOTOGRAPHIC ACCESSORY.
APPLICATION FILED APR. 22, 1921.
1,403,677.
Patented Jan. 17, 1922.
3 SHEETS—SHEET 1.
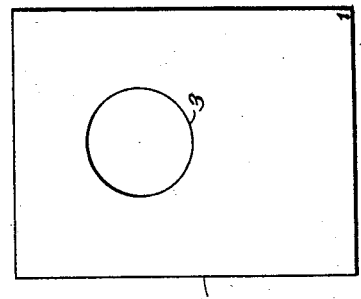
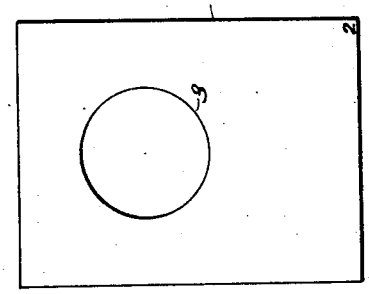
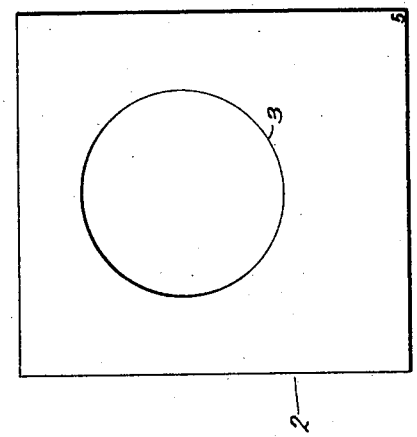
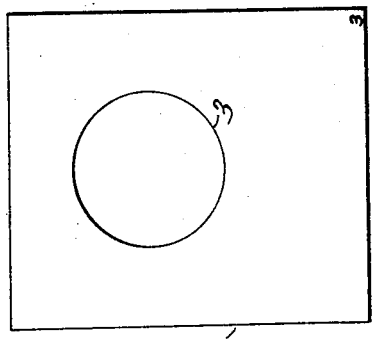
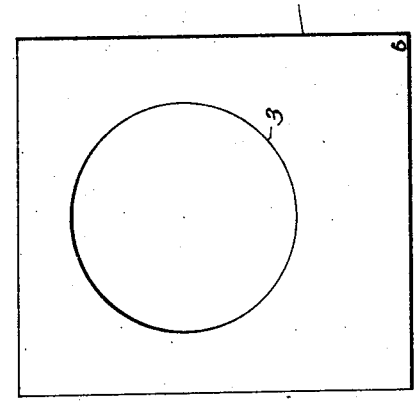
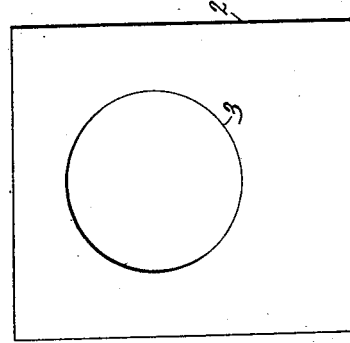
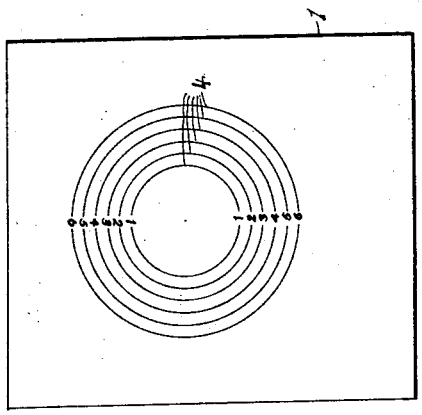
Inventor
Walter Faas
By Attorney W. FAAS.
PHOTOGRAPHIC ACCESSORY.
APPLICATION FILED APR. 22, 1921.
1,403,677.
Patented Jan. 17, 1922.
3 SHEETS—SHEET 2.
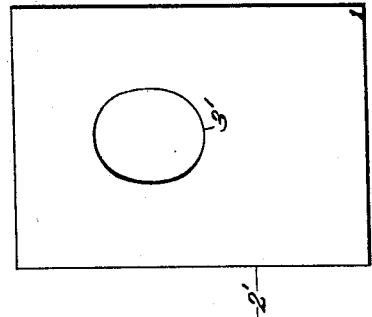
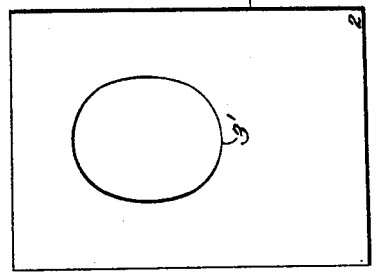
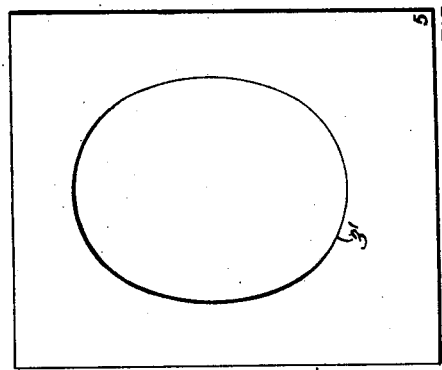
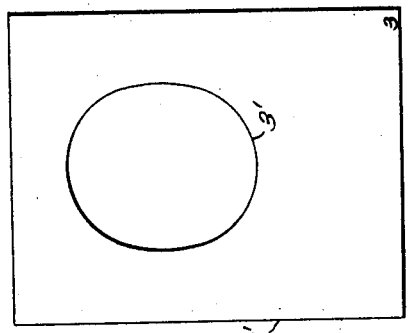
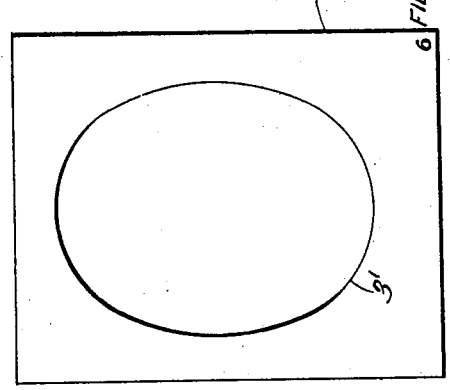
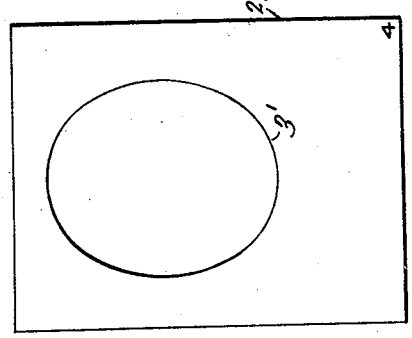
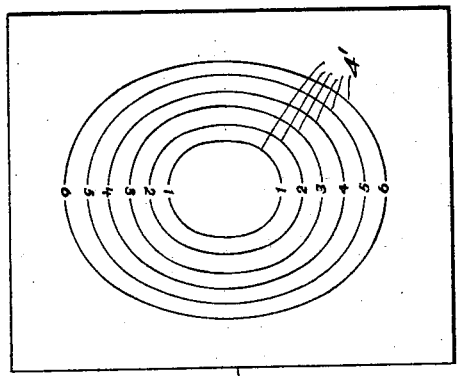
Inventor
Walter Faas
By Attorney

W. FAAS.
PHOTOGRAPHIC ACCESSORY.
APPLICATION FILED APR. 22, 1921.

1,403,677.

Patented Jan. 17, 1922.
3 SHEETS—SHEET 3.

Inventor
Walter Faas
By Attorney

UNITED STATES PATENT OFFICE.

WALTER FAAS, OF SAN DIEGO, CALIFORNIA.

PHOTOGRAPHIC ACCESSORY.

1,403,677.   Specification of Letters Patent.   Patented Jan. 17, 1922.

Application filed April 22, 1921. Serial No. 463,527.

*To all whom it may concern:*

Be it known that I, WALTER FAAS, a citizen of the United States, resident of San Diego, in the county of San Diego and State of California, have invented certain new and useful Photographic Accessories, of which the following is a specification.

This invention relates to photographic accessories, having more particular reference to a means for quickly determining the most suitable size and outline to be given the prints from any negative, being intended more particularly for the use of professional photographers although not in any way limited to use by the same.

The invention has for an object to provide a simple means by the use of which selection of the mask to be used on the negative to give the most suitable size and outline of picture is greatly facilitated, enabling such selection to be made with a minimum of handling thereof and of the masks, and resulting in considerable saving of time.

For further comprehension of the invention, and of the objects and advantages thereof, reference will be had to the following description and accompanying drawings in which the invention is set forth in detail, the various combinations, sub-combinations and features of construction forming the invention being set forth more particularly in the appended claims.

In carrying out my invention I provide, briefly speaking, a selecting, or test device which I term a test mask, or trial mask which is adapted to be placed in suitable positioning with respect to the negative from which the print is to be made, being preferably placed on the negative. In conjunction with this trial mask I provide a series of true masks presenting different or differently arranged apertures, the trial mask being arranged so that the part of the negative which would be revealed through any one of the true masks can be seen at a glance while suitable indicating characters are provided for determining which of the true masks has the corresponding exposure aperture.

In the accompanying drawings I have illustrated the invention as embodied for use in connection with the most commonly employed picture outlines, it being understood that the arrangement may be varied to suit any outline that may be established by custom, or that may be desired.

Figure 1 of the drawings is a face view of a trial mask as arranged for use when pictures of circular outline are to be produced.

Figures 2 to 7 inclusive are face views of the different true masks which may be selected by the use of the trial mask.

Figure 8 is a face view of a trial mask as arranged for use when pictures of oval outline are to be produced.

Figure 9 to 14 inclusive are face views of the different true masks which may be selected by the use of the trial mask shown in Figure 8.

Figure 15:
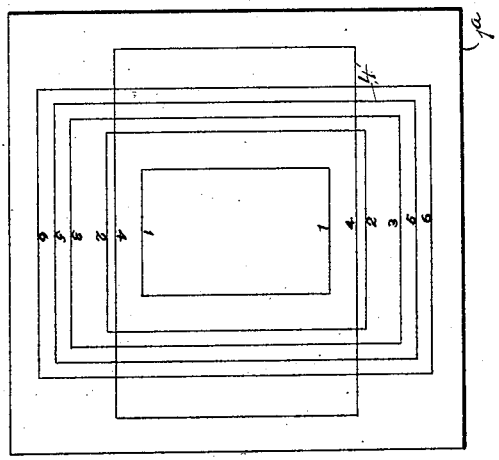

Figure 15 is a face view of a trial mask as arranged for use when pictures of rectangular outline are to be produced.

Figures 16 to 21 inclusive are face views of the different true masks which may be selected by the use of the trial mask shown in Figure 15.

The different trial masks are indicated by the reference numerals 1, 1' and 1ª which designate respectively the forms shown in Figures 1, 8 and 15. These trial masks may be of such outline as is desired, generally rectangular, and are preferably made of transparent paper of stiff parchment like quality. They might also be made of glass, in which case the enclosure thereof in a suitable frame would be desirable to prevent breakage during handling.

The various series of true masks are indicated generally by the reference numerals 2, 2' and 2ª which designate respectively the forms shown in Figures 2 to 7, 9 to 14, and 16 to 21, these masks having exposure or printing apertures 3, 3' and 3ª respectively, therein, the apertures of the different masks of each series being of suitable progressively varying sizes. These true masks may be the ordinary type of mask which is made of black paper.

Upon each of these trial masks are printed, painted, or otherwise placed, a series of lines indicated generally at 4, 4' and 4ª for the respective trial masks, these lines being arranged in correspondence to the different series of exposure apertures 3, 3' and 3ª, the lines on the trial mask 1 being of circular outline; of the trial mask 1', of oval outline; and of the trial mask 1ª, of rectangular outline.

The different lines of the respective trial masks are arranged in a generally concentric disposition (although I have indicated a slightly different arrangement of one of these lines in Fig. 15) and the spaces enclosed by the different lines correspond to the exposure apertures 3, 3' and 3ª, of the series of true masks.

The series of lines on the trial masks are suitably numbered, as here shown from one to six, while each series of true masks is correspondingly numbered, it being understood of course that the true mask has the same number as the line which encloses a space equal to that of the exposure aperture in the true mask. The lines and numbers on the trial masks should be fairly heavy, so as to be readily visible when viewed as applied to the negative, while the numbers on the true masks will naturally be in a light color to be readily seen.

It is believed that the manner of use of my invention will be readily understood from the above description. The trial mask is placed on the negative and viewed against the light and since the relation of all the lines on the mask to the picture on the negative is seen at once, the most suitable size for the printed picture can be seen at a glance and the corresponding true mask immediately selected, and a considerable saving of time effected since the individual application of the different true masks to the negative until the most suitable one is found is rendered unnecessary.

While I have indicated an arrangement in which there are only six masks in each series, it is to be understood that this number may be varied as may seem desirable, and that other changes or modifications, not herein set forth or referred to, may be made in carrying out the invention without departing from the spirit and scope thereof.

Having thus described my invention, what I claim as new and desire to protect by Letters Patent of the United States is as follows:—

1. In photographic work, the method of selecting one of a series of true masks having different exposure areas which consists in placing upon a negative to be printed a transparent trial mask having different markings defining spaces corresponding to the different exposure areas of the true masks.

2. A photographic accessory comprising a transparent trial mask having different markings defining spaces corresponding to the different exposure areas of a series of true masks.

3. A photographic accessory comprising a transparent trial mask having a series of concentrically arranged lines thereon enclosing spaces corresponding to the different exposure areas of a series of varying true masks.

4. A photographic accessory comprising a transparent trial mask, and a series of true masks having varying exposure openings, said trial mask having different markings defining spaces corresponding to the respective exposure openings of the said true masks.

5. A photographic accessory comprising a transparent trial mask, and a series of true masks having varying exposure openings, said trial mask having different markings defining spaces corresponding to the respective exposure openings of the said true masks, the said true masks, and the corresponding markings on the trial masks, having related indicating characters placed thereon.

6. A photographic accessory comprising a transparent trial mask, and a series of true masks having progressively varying exposure openings, said trial mask having a series of concentrically arranged lines thereon enclosing spaces corresponding to the respective exposure areas of the said true masks.

7. A photographic accessory comprising a transparent trial mask, and a series of true masks having progressively varying exposure openings, said trial mask having a series of concentrically arranged lines thereon enclosing spaces corresponding to the respective exposure areas of the said true masks, the said true masks, and the corresponding lines on the trial mask, having related indicating characters placed thereon.

Signed at San Diego in the county of San Diego and State of California this 8th day of March, A. D., 1921.

WALTER FAAS.